United States Patent
Chen et al.

(10) Patent No.: US 9,391,534 B2
(45) Date of Patent: Jul. 12, 2016

(54) COMPARATOR BASED SYNCHRONOUS RECTIFIER CONTROL CIRCUIT AND SYNCHRONOUS RECTIFIER CONTROL METHOD

(71) Applicant: Huawei Technologies Co., Ltd., Shenzhen (CN)

(72) Inventors: Wenbin Chen, Shenzhen (CN); Jie Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/585,929

(22) Filed: Dec. 30, 2014

(65) Prior Publication Data

US 2015/0109838 A1    Apr. 23, 2015

Related U.S. Application Data

(63) Continuation of application No. PCT/CN2014/081933, filed on Jul. 10, 2014.

(30) Foreign Application Priority Data

Aug. 29, 2013  (CN) .......................... 2013 1 0386084

(51) Int. Cl.
*H02M 7/06* (2006.01)
*H02M 1/08* (2006.01)
(Continued)

(52) U.S. Cl.
CPC ........ *H02M 7/06* (2013.01); *H02M 1/08* (2013.01); *H02M 7/217* (2013.01);
(Continued)

(58) Field of Classification Search
CPC ........................................ H20M 7/06

USPC ............... 363/126, 21.06, 125, 21.14
See application file for complete search history.

(56) References Cited

U.S. PATENT DOCUMENTS 3,890,537 A * 6/1975 Park ............... H05B 41/24
                                              315/208
5,202,819 A   4/1993 Min
(Continued)

FOREIGN PATENT DOCUMENTS

CN         2731832 Y     10/2005
CN       101388611 A      3/2009
(Continued)

OTHER PUBLICATIONS

Foreign Communication From a Counterpart Application No. 201310386084.2, Extended European Search Report dated May 6, 2015, 8 pages.
(Continued)

*Primary Examiner* — Jue Zhang
*Assistant Examiner* — Trinh Dang
(74) *Attorney, Agent, or Firm* — Conley Rose, P.C.; Grant Rodolph (57) ABSTRACT

A synchronous rectifier control circuit an includes a current transformer (CT), a bridge rectifier, and a comparator, where the CT is connected in series to a secondary side, performs sampling on a loop current of the secondary side to obtain a current detection signal, and outputs the obtained current detection signal to the bridge rectifier; the bridge rectifier acquires a secondary-side sampling current according to the current detection signal, and outputs the secondary-side sampling current to the comparator so that the comparator generates a voltage difference; and an output signal of the comparator turns over so as to control on and off of a synchronous rectifier transistor. In this way, high-speed and high-precision control over a synchronous rectifier transistor can be implemented. The control is simple and is low in cost.

20 Claims, 4 Drawing Sheets

(51) Int. Cl.
*H02M 7/217* (2006.01)
*H02M 7/00* (2006.01)
*H02M 3/335* (2006.01)
*H02M 1/00* (2006.01)

(52) U.S. Cl.
CPC ...... *H02M 3/33546* (2013.01); *H02M 3/33592* (2013.01); *H02M 7/00* (2013.01); *H02M 2001/0009* (2013.01); *Y02B 70/1475* (2013.01)

(56) References Cited

U.S. PATENT DOCUMENTS

| | | | |
|---|---|---|---|
| 2005/0068792 A1 | 3/2005 | Yasumura | |
| 2011/0038182 A1* | 2/2011 | Li | H02M 3/33592 363/21.06 |
| 2012/0146599 A1 | 6/2012 | Oyama | |
| 2012/0218793 A1 | 8/2012 | Springett et al. | |
| 2013/0182462 A1* | 7/2013 | Sorge | H02M 1/083 363/21.02 |

FOREIGN PATENT DOCUMENTS

| | | |
|---|---|---|
| CN | 101588138 A | 11/2009 |
| CN | 101997434 A | 3/2011 |
| CN | 102005933 A | 4/2011 |
| CN | 102170240 A | 8/2011 |
| CN | 102541142 A | 7/2012 |
| CN | 202872622 U | 4/2013 |
| CN | 103475195 A | 12/2013 |
| JP | 55144779 A | 11/1980 |
| JP | 09163748 A | 6/1997 |

OTHER PUBLICATIONS

Partial English Translation and Abstract of Chinese Patent Application No. CN101997434A, Mar. 2, 2015, 3 pages.
Partial English Translation and Abstract of Chinese Patent Application No. CN103475195A, Mar. 2, 2015, 2 pages.
Partial English Translation and Abstract of Japanese Patent Application No. JPH09163748, Mar. 2, 2015, 12 pages.
Foreign Communication From a Counterpart Application, PCT Application No. PCT/CN2014/081933, English Translation of International Search Report dated Oct. 14, 2014, 3 pages.
Foreign Communication From a Counterpart Application, PCT Application No. PCT/CN2014/081933, Written Opinion dated Oct. 14, 2014, 6 pages.
Kong, Z., et al., "Design of an area-efficient CMOS multiple-valued current comparator circuit," IEE Proc. Circuits Devices System, vol. 152, No. 2, Apr. 2005, pp. 151-158.
Foreign Communication From a Counterpart Application, European Application No. 14812393.8, Extended European Search Report dated Feb. 5, 2016, 9 pages.

* cited by examiner

COMPARATOR BASED SYNCHRONOUS RECTIFIER CONTROL CIRCUIT AND SYNCHRONOUS RECTIFIER CONTROL METHOD

CROSS-REFERENCE TO RELATED APPLICATIONS

This application is a continuation of International Application No. PCT/CN2014/081933, filed on Jul. 10, 2014, which claims priority to Chinese Patent Application No. 201310386084.2, filed on Aug. 29, 2013, both of which are hereby incorporated by reference in their entireties.

TECHNICAL FIELD

The present invention relates to the field of electronics, and in particular, to a synchronous rectifier control circuit and a synchronous rectifier control method.

BACKGROUND

At present, a synchronous rectifier technology is widely used in various efficient power supplies, and is critical to power supply efficiency improvement and heat loss reduction. However, control over a synchronous rectifier circuit is relatively complex, and high efficiency is achieved along with a reliability risk.

In the prior art, control over a synchronous rectifier transistor is implemented mainly based on a time sequence of a primary-side switching transistor. To implement control over a synchronous rectifier transistor based on a time sequence of a primary-side switching transistor, an accurate time sequence of a primary side needs to be obtained first. Generally, a digital signal processor is required to process the time sequence of the primary side and transmit a driving signal to a secondary side, and a corresponding isolating circuit is required. This control circuit is complex in design and high in cost.

In the prior art, control over a synchronous rectifier transistor is also implemented based on a digital signal (DS) end voltage of a synchronous rectifier transistor. To implement control over a synchronous rectifier transistor based on a DS end voltage of the synchronous rectifier transistor, accurate sampling needs to be performed on the DS end voltage. Generally, a compensation circuit is required to offset an effect of a parasitic parameter, and a high-speed comparator needs to be used to implement efficient control. This control circuit is complex in design and high in cost.

SUMMARY

Embodiments of the present invention provide a synchronous rectifier control circuit and a synchronous rectifier control method, which are used to implement high-speed and high-precision control over a synchronous rectifier transistor and is simple in control and is low in cost.

A first aspect of the present invention provides a synchronous rectifier control circuit, where the circuit may include: a current transformer (CT), a bridge rectifier, and a comparator, where the CT is configured to be connected in series to a secondary side, perform sampling on a loop current of the secondary side to obtain a current detection signal, and output the obtained current detection signal to the bridge rectifier; the bridge rectifier is configured to receive the current detection signal that is output by the CT, acquire a secondary-side sampling current according to the current detection signal, and output the secondary-side sampling current to the comparator so that the comparator generates a voltage difference; and the comparator is configured to receive the secondary-side sampling current that is output by the bridge rectifier to generate a voltage difference so that an output signal of the comparator turns over so as to control on and off of a synchronous rectifier transistor.

In a first possible implementation manner, the comparator is a current mirror comparator, and the comparator includes a first transistor and a second transistor.

With reference to the first possible implementation manner of the first aspect, in a second possible implementation manner, the first transistor in the comparator receives the secondary-side sampling current that is output by the bridge rectifier, and an emitter of the second transistor generates a voltage difference so that the output signal of the comparator turns over.

With reference to the first possible implementation manner of the first aspect, in a third possible implementation manner, an input end of the first transistor is connected to an input end of the second transistor, connected to a first output end of the second transistor through a diode, and connected to a first output end of the first transistor; the first output end of the first transistor is connected to the first output end of the second transistor, and a second output end of the first transistor is connected to the bridge rectifier; and a second output end of the second transistor is connected to the bridge rectifier.

With reference to the first aspect, or the first possible implementation manner, the second possible implementation manner, or the third possible implementation manner of the first aspect, in a fourth possible implementation manner, the CT is connected in series to a current loop of a secondary-side winding, a neutral wire, an upper tube, or a lower tube of each configuration on the secondary side.

With reference to the first aspect, or the first possible implementation manner, the second possible implementation manner, or the third possible implementation manner of the first aspect, in a fifth possible implementation manner, the bridge rectifier includes four diodes.

A second aspect of the present invention provides a synchronous rectifier control method, where the method may include: connecting a CT in series to a secondary side, performing, by the CT, sampling on a secondary-side current to obtain a current detection signal, and outputting the current detection signal to a bridge rectifier; receiving, by the bridge rectifier, the current detection signal to obtain a secondary-side sampling current, and outputting the secondary-side sampling current to a comparator; and receiving, by the comparator, the secondary-side sampling current so that the comparator generates a voltage difference, and an output signal of the comparator turns over so as to control on and off of a synchronous rectifier transistor.

In a first possible implementation manner, the comparator is a current mirror comparator, and the comparator includes a first transistor and a second transistor.

With reference to the first possible implementation manner of the first aspect, in a second possible implementation manner, the first transistor in the comparator receives the secondary-side sampling current that is output by the bridge rectifier, and an emitter of the second transistor generates the voltage difference so that the output signal of the comparator turns over.

With reference to the first aspect or the first possible implementation manner or the second possible implementation manner of the first aspect, in a third possible implementation manner, the CT is connected in series to a current loop of a secondary-side winding, a neutral wire, an upper tube, or a lower tube of each configuration on the secondary side.

It can be seen from the foregoing technical solutions that, the embodiments of the present invention have the following advantages:

In the present invention, a CT, a bridge rectifier, and a comparator are included, where the CT is connected in series to a secondary side, performs sampling on a loop current of the secondary side to obtain a current detection signal, and outputs the obtained current detection signal to the bridge rectifier; and the bridge rectifier acquires a secondary-side sampling current according to the current detection signal, and outputs the secondary-side sampling current to the comparator so that the comparator generates a voltage difference, and an output signal of the comparator turns over so as to control on and off of a synchronous rectifier transistor. In the embodiments, control over a synchronous rectifier transistor is implemented by utilizing a characteristic of synchronization between a secondary-side current direction and conduction of a diode in a bridge rectifier, and a high-speed signal turnover of a comparator is implemented by utilizing a voltage drop of the diode in the bridge rectifier so that control over a synchronous rectifier transistor can be implemented as long as a faint current exists. In this way, high-speed and high-precision control over a synchronous rectifier transistor can be implemented. This control circuit is simple and is low in cost.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

Embodiments of the present invention provide a synchronous rectifier control circuit and a synchronous rectifier control method, which can implement high-speed and high-precision control over a synchronous rectifier transistor. The control is simple and is low in cost. Specific descriptions are separately provided in the following. For details, reference may be made to FIG. 1 to FIG. 8.

Embodiment 1

An embodiment of the present invention provides a synchronous rectifier control method. For ease of description, a description is provided from a perspective of a synchronous rectifier.

A synchronous rectifier control method includes: connecting a CT in series to a secondary side, performing, by the CT, sampling on a secondary-side current to obtain a current detection signal, and outputting the current detection signal to a bridge rectifier; receiving, by the bridge rectifier, the current detection signal to obtain a secondary-side sampling current, and outputting the secondary-side sampling current to a comparator; and receiving, by the comparator, the secondary-side sampling current so that the comparator generates a voltage difference, and an output signal of the comparator turns over so as to control on and off of a synchronous rectifier transistor.

Figure 1:
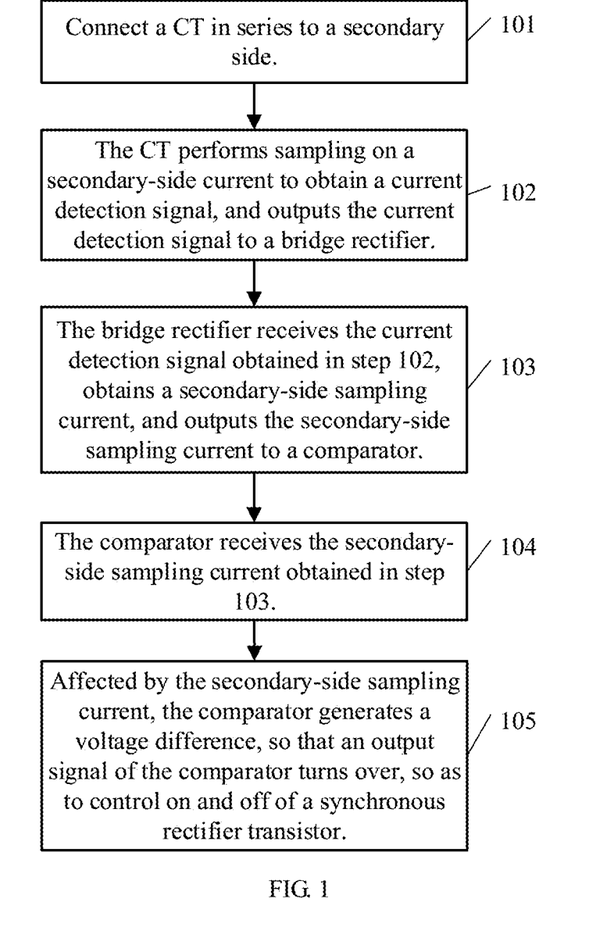
FIG. 1 is a flowchart of a synchronous rectifier control method according to an embodiment of the present invention.

Referring to FIG. 1, a specific process of the control method may be as follows:

101: Connect a CT in series to a secondary side.

It should be understood that, a CT can convert a primary current with a relatively large numeric value into a secondary current with a relatively small numeric value so as to perform protection, measurement, and the like.

In this embodiment, the CT may be connected in series to a secondary side of a power loop, for example, the CT may be connected in series to a current loop of a secondary-side winding, a neutral wire, an upper tube, or a lower tube of each configuration on the secondary side. Specifically, a detailed description is provided in the following embodiment, and details are not described any further herein.

102: The CT performs sampling on a secondary-side current to obtain a current detection signal, and outputs the current detection signal to a bridge rectifier.

The CT is connected in series to the secondary side, and performs detection on a loop current on the secondary side, to further obtain an isolated current detection signal.

103: The bridge rectifier receives the current detection signal obtained in step 102 to obtain a secondary-side sampling current, and outputs the secondary-side sampling current to a comparator.

The bridge rectifier receives the current detection signal that is output by the CT, and obtains a corresponding voltage, that is, the secondary-side sampling current is obtained.

The obtained secondary-side sampling current may be used to implement control over a synchronous rectifier transistor, and by utilizing conduction or cutoff of a diode in the bridge rectifier, the comparator generates a voltage difference, thereby causing an output signal of the comparator to turn over, and further controlling on and off of the synchronous rectifier transistor.

In addition, the secondary-side sampling current may also be transmitted to a digital signal processor, or another control circuit to perform control over an output current so as to perform current limiting, and overcurrent and short circuit protection.

The bridge rectifier in this embodiment performs rectification by utilizing unidirectional conductivity of a diode. The bridge rectifier in this embodiment may include four diodes, which are D1, D2, D3, and D4. For example, when a forward voltage or current is imposed on D1 and D4, D1 and D4 are conducted; and when a reverse voltage or current is imposed on D2 and D3, D2 and D3 is cut off, and when a forward voltage or current is imposed on D2 and D3, D2 and D3 are conducted; and when a reverse voltage or current is imposed on D1 and D4, D1 and D4 is cut off.

104: The comparator receives the secondary-side sampling current obtained in step 103.

Preferably, the comparator in this embodiment may be a current mirror comparator. Specifically, the current mirror comparator may include two transistors. For ease of description, the two transistors may be described as a first transistor and a second transistor. It should be noted that, the number of transistors in the embodiment is not limited.

Specifically, the first transistor in the comparator may receive the secondary-side sampling current that is output by the bridge rectifier, and an emitter of the second transistor generates a voltage difference so that the output signal of the comparator turns over. Specific implementation is described in detail in the following embodiment, and details are not described any further herein.

After receiving the secondary-side sampling current that is output by the bridge rectifier, the comparator generates a voltage difference, thereby utilizing the voltage difference to implement control over on and off of the synchronous rectifier transistor.

105: Affected by the secondary-side sampling current, the comparator generates a voltage difference so that an output signal of the comparator turns over so as to control on and off of a synchronous rectifier transistor.

The secondary-side sampling current that is output by the bridge rectifier is input to the comparator, and affected by the secondary-side sampling current, an emitter of a transistor in the comparator generates a voltage difference by utilizing conduction or cutoff of a diode in the bridge rectifier. In this case, the output signal of the comparator turns over so as to control on and off of the synchronous rectifier transistor.

It should be noted that, as long as a faint current passes through the diode in the bridge rectifier, a conduction voltage drop of the diode in the bridge rectifier may cause a high-speed signal turnover of the comparator so as to control on and off of the synchronous rectifier transistor.

It should be noted that, for specific implementation of a synchronous rectifier controller circuit, reference may be made to the following embodiment, and details are not described any further in this embodiment.

It can be known from the foregoing description that, in the present invention, first, a current transformer CT is connected in series to a secondary side, the CT performs sampling on a secondary-side current to obtain a current detection signal, and outputs the current detection signal to a bridge rectifier; and the bridge rectifier obtains a secondary-side sampling current, and outputs the secondary-side sampling current to a comparator so that the comparator generates a voltage difference, and an output signal of the comparator turns over so as to control on and off of a synchronous rectifier transistor. In this embodiment, control over a synchronous rectifier transistor is implemented by utilizing a characteristic of synchronization between a secondary-side current direction and conduction of a diode in a bridge rectifier, and a high-speed signal turnover of a comparator is implemented by utilizing a voltage drop of the diode in the bridge rectifier so that control over a rectifier transistor can be implemented as long as a faint current exists. In this way, high-speed and high-precision control over a synchronous rectifier transistor can be implemented. The control is simple and is low in cost.

Embodiment 2

Figure 2:
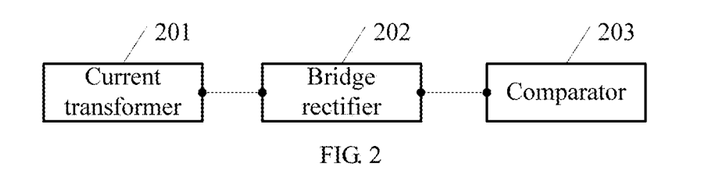
FIG. 2 is a structural diagram of a synchronous rectifier control circuit according to an embodiment of the present invention.

To better implement the foregoing solution, an embodiment further provides a synchronous rectifier control circuit, where the synchronous rectifier control circuit may specifically include a CT 201, a bridge rectifier 202, and a comparator 203. For details, reference may be made to FIG. 2. FIG. 2 is a structural diagram of a synchronous rectifier control circuit.

The current transformer 201 is configured to be connected in series to a secondary side, perform sampling on a loop current of the secondary side to obtain a current detection signal, and output the obtained current detection signal to the bridge rectifier 202.

The bridge rectifier 202 is configured to receive the current detection signal that is output by the current transformer 201, obtain a secondary-side sampling current according to the current detection signal, and output the secondary-side sampling current to the comparator 203 so that the comparator 203 generates a voltage difference.

The comparator 203 is configured to receive the secondary-side sampling current that is output by the bridge rectifier 202, and generate the voltage difference so that an output signal of the comparator 203 turns over so as to control on and off of a synchronous rectifier transistor.

Figure 3:
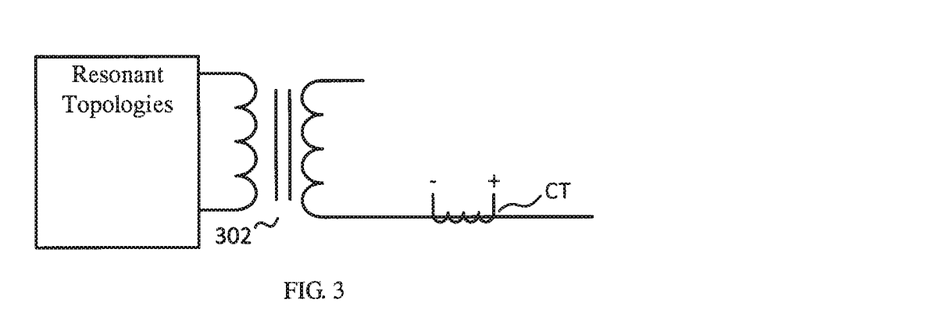
FIG. 3 is a schematic diagram of a CT connected in series to a secondary-side winding according to an embodiment of the present invention.
Figure 4:
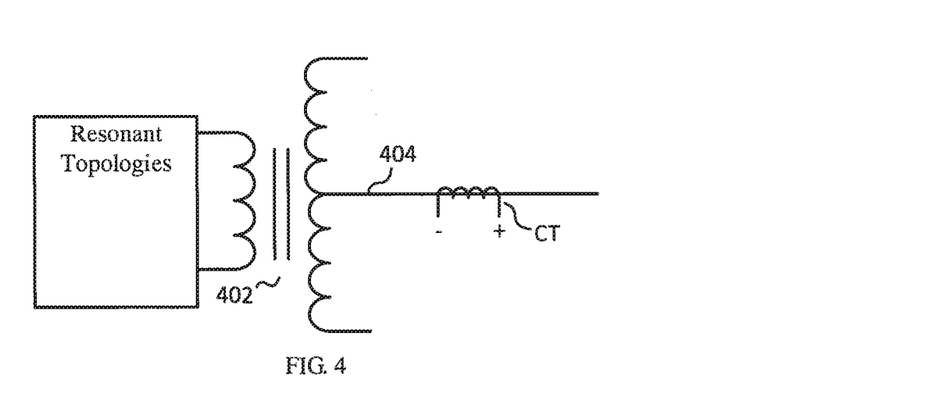
FIG. 4 is a schematic diagram of a CT connected in series to a neutral wire of each configuration on a secondary side according to an embodiment of the present invention.
Figure 5:
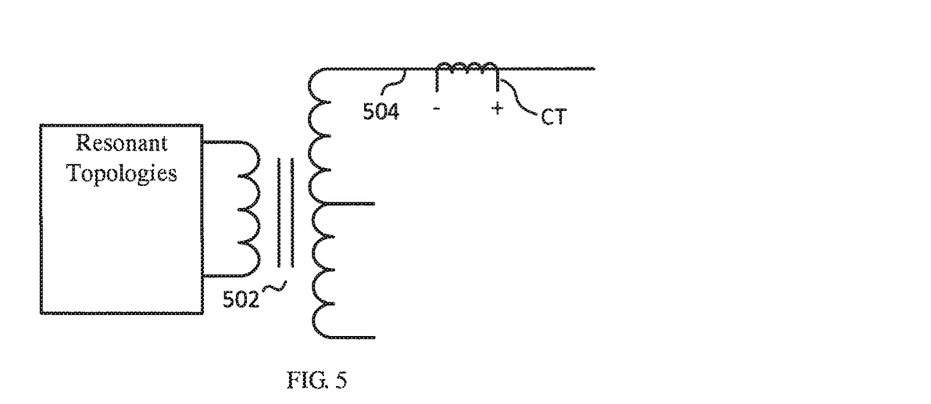
FIG. 5 is a schematic diagram of a CT connected in series to an upper tube of each configuration on a secondary side according to an embodiment of the present invention.
Figure 6:
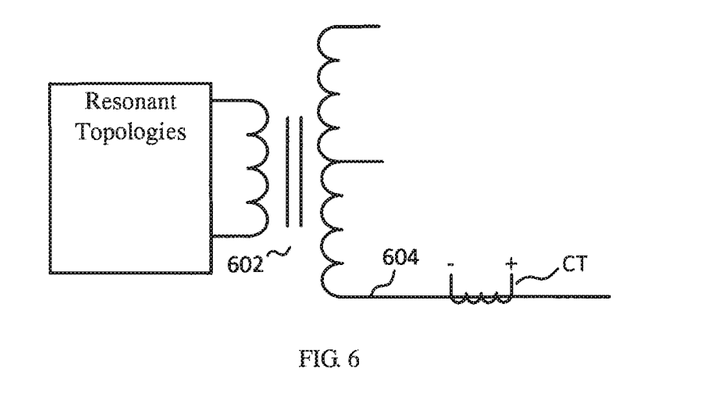
FIG. 6 is a schematic diagram of a CT connected in series to a lower tube of each configuration on a secondary side according to an embodiment of the present invention.

In this embodiment, the CT may be connected in series to a current loop of a secondary-side winding, a neutral wire, an upper tube, or a lower tube of each configuration on the secondary side of a transformer. For details, reference may be made to FIG. 3 to FIG. 6. FIG. 3 is a schematic diagram of a CT connected in series to a secondary-side winding of a transformer 302; FIG. 4 is a schematic diagram of a CT connected in series to a neutral wire 404 of each configuration on a secondary side of a transformer 402; FIG. 5 is a schematic diagram of a CT connected in series to an upper tube 504 of each configuration on a secondary side of a transformer 502; and FIG. 6 is a schematic diagram of a CT connected in series to a lower tube 604 of each configuration on a secondary side of a transformer 602.

It should be understood that, a dotted terminal of the current transformer shown in FIG. 3 to FIG. 6, and logic of a control signal may be configured according to an actual demand, which are not specifically limited.

Figure 7:
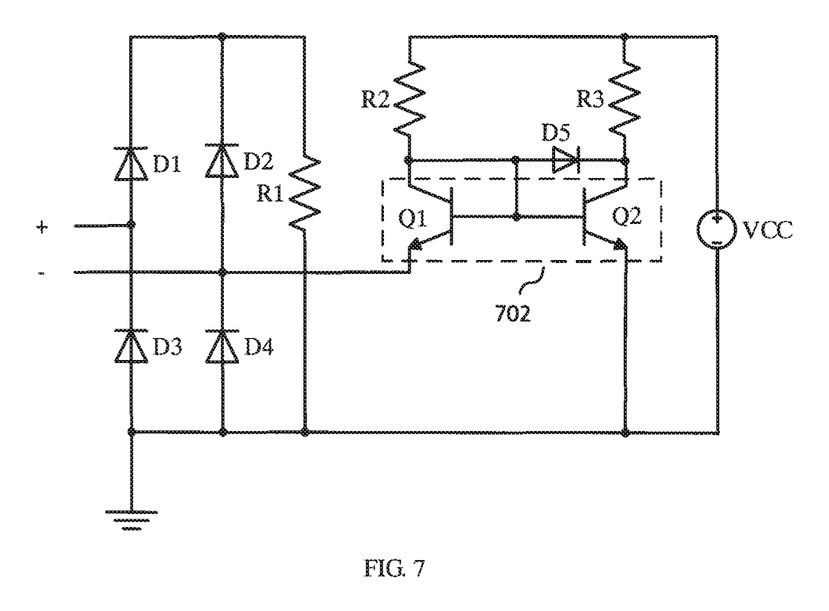
FIG. 7 is a partial control circuit diagram of a synchronous rectifier control circuit according to an embodiment of the present invention.

Preferably, the comparator in this embodiment may be a current mirror comparator 702. Specifically, the current mirror comparator 702 may include a first transistor and a second transistor. For ease of description, Q1 may be used to represent the first transistor, and Q2 may be used to represent the second transistor, and both Q1 and Q2 comprise a base, a collector, and an emitter. Because the current mirror comparator 702 is affected by a sampling current, an emitter of a transistor in the current mirror comparator 702 generates a voltage difference so that the output signal of the current mirror comparator 702 turns over so as to control on and off of the synchronous rectifier transistor.

It should be noted that, as long as a faint current passes through a diode in the bridge rectifier, a conduction voltage drop of the diode in the bridge rectifier may cause a high-speed signal turnover of the current mirror comparator 702 so as to control on and off of the synchronous rectifier transistor.

For details, reference may be made to FIG. 7. FIG. 7 is a partial control circuit diagram of a synchronous rectifier control circuit according to this embodiment. As shown in the figure, an input end of Q1 is connected to an input end of Q2, connected to a first output end of Q2 through a diode D5, and connected to a first output end of Q1; the first output end of Q1 is connected to the first output end of Q2, and a second output end of Q1 is connected to the bridge rectifier; and a second output end of Q2 is connected to the bridge rectifier. Q1 in the current mirror comparator 702 receives a secondary-side sampling current that is output by the bridge rectifier, the conduction voltage drop of the diode in the bridge rectifier causes the high-speed signal turnover of the current mirror comparator 702, and a control signal is obtained from the transistor Q2 so that an emitter of Q2 generates a voltage difference, and an output signal of the current mirror comparator 702 turns over so as to control on and off of the synchronous rectifier transistor.

That the input end of Q1 is connected to the first output end of Q1 may specifically be that a base of Q1 is connected to a collector of Q1.

The first output end of Q2 may further be connected to a voltmeter, and connected to the bridge rectifier through the voltmeter.

The bridge rectifier in this embodiment may include four diodes, where the four diodes may be D1, D2, D3, and D4. D1, D2, D3, and D4 form the bridge rectifier. The CT is connected in series to a secondary side of the synchronous rectifier control circuit, detects a loop current of the secondary side to obtain a current detection signal, and outputs the current detection signal to the bridge rectifier so as to obtain a sampling current, where the sampling current is output to the transistor Q1 in the current mirror comparator 702; the conduction voltage drop of the diode in the bridge rectifier may cause a high-speed signal turnover of the current mirror comparator 702, and a control signal is obtained from the transistor Q2 so as to control on and off of the synchronous rectifier transistor according to potential of a collector of the transistor Q2.

Figure 8:
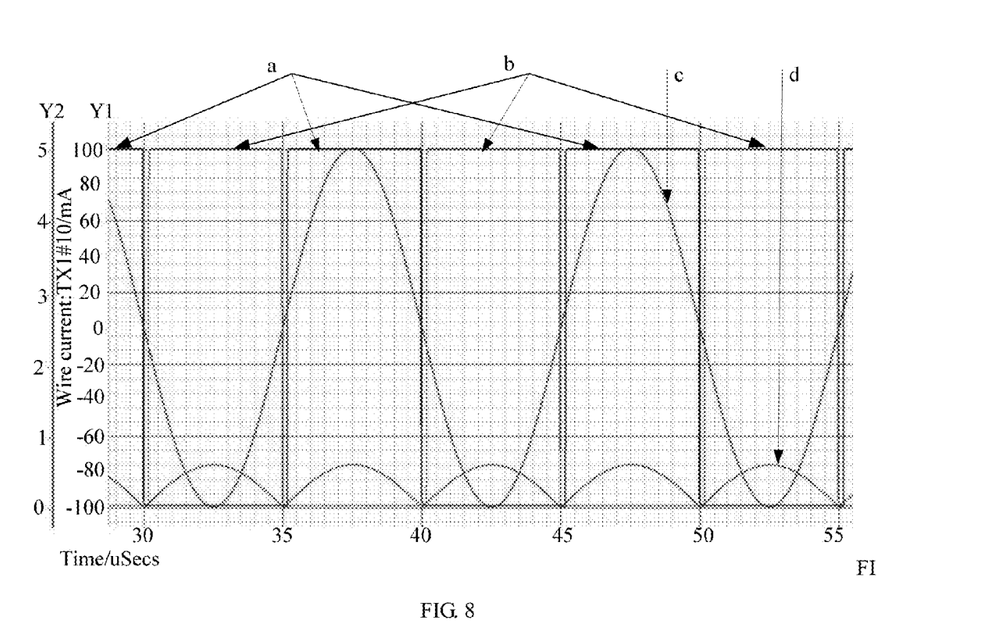
FIG. 8 is a schematic diagram of a simulation structure of a synchronous rectifier control circuit according to an embodiment of the present invention.

For details of the foregoing simulation result, reference may be made to FIG. 8. FIG. 8 is a schematic diagram of a simulation structure of a synchronous rectifier control circuit according to an embodiment of the present invention, where a horizontal axis represents time, and a vertical axis represents a current sampling signal and a control signal of a synchronous rectifier transistor. FIG. 8 shows four different curves, where curve a and curve b represent control signals of a synchronous rectifier transistor, curve c represents a secondary-side current, and curve d represents a rectified current sampling signal.

According to the foregoing description, in the present invention, a current transformer CT, a bridge rectifier, and a comparator are included, where the current transformer CT is connected in series to a secondary side, performs sampling on a loop current of the secondary side to obtain a current detection signal, and outputs the obtained current detection signal to the bridge rectifier; and the bridge rectifier acquires a secondary-side sampling current according to the current detection signal, and outputs the secondary-side sampling current to the comparator so that the comparator generates a voltage difference; and an output signal of the comparator turns over so as to control on and off of a synchronous rectifier transistor. In this embodiment, control over a synchronous rectifier transistor is implemented by utilizing a characteristic of synchronization between a secondary-side current direction and conduction of a diode in a bridge rectifier, and a high-speed signal turnover of comparator is implemented by utilizing a voltage drop of the diode in the bridge rectifier so that control over a synchronous rectifier transistor can be implemented as long as a faint current exists. In this way, high-speed and high-precision control over a synchronous rectifier transistor can be implemented. The control circuit is simple and is low in cost.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

The foregoing describes in detail a synchronous rectifier control circuit and a synchronous rectifier control method provided by the present invention. In this document, specific examples are used to illustrate the principles and implementation methods of the present invention. Descriptions of the foregoing embodiments are merely intended to help understand the method and core principles of the present invention. Meanwhile, for a person skilled in the art, according to the principles of the present invention, changes may be made to specific implementation methods and application scope. To sum up, the content of this specification shall not be understood as a limitation to the present invention.

What is claimed is:

1. A synchronous rectifier control circuit, comprising:
   a bridge rectifier;
   a current mirror comparator comprising a first transistor and a second transistor; and
   a current transformer (CT) configured to:
      connect in series to a secondary side of a transformer;
      perform sampling on a loop current of the secondary side of the transformer o obtain a current detection signal; and
      output the obtained current detection signal to the bridge rectifier,
   wherein the bridge rectifier is configured to:
      receive the current detection signal that is output by the CT;
      generate a secondary-side sampling current according to the current detection signal; and
      output the secondary-side sampling current to the current mirror comparator so that the current mirror comparator generates a voltage difference,
   wherein the current o comparator is configured to:
      receive the secondary-side sampling current that is output by the bridge rectifier; and
      generate the voltage difference so that an output signal of the current mirror comparator turns over so as to control on and off of a synchronous rectifier transistor,
   wherein the first transistor in the comparator is configured to receive the secondary-side sampling current that is output by the bridge rectifier, and
   wherein the second transistor comprises an emitter configured to generate a voltage difference so that the output signal of the comparator turns over.

2. The synchronous rectifier control circuit according to claim 1, wherein an input end of the first transistor is configured to connect to an input end of the second transistor, connect to a first output end of the second transistor through a diode, and connect to a first output end of the first transistor, wherein the first output end of the first transistor is configured to connect to the first output end of the second transistor, wherein a second output end of the first transistor is configured to connect to the bridge rectifier, and wherein a second output end of the second transistor is configured to connect to the bridge rectifier.

3. The synchronous rectifier control circuit according to claim 1, wherein the CT is configured to connect in series to a current loop of a secondary-side winding of the transformer.

4. The synchronous rectifier control circuit according to claim 1, wherein the CT is configured to connect in series to a neutral wire of the transformer.

5. The synchronous rectifier control circuit according to claim 1, wherein the CT is configured to connect in series to an upper tube of the transformer.

6. The synchronous rectifier control circuit according to claim 1, wherein the CT is configured to connect in series to a lower tube of each configuration on the secondary side of the transformer.

7. The synchronous rectifier control circuit according to claim 1, wherein the bridge rectifier comprises four diodes.

8. The synchronous rectifier control circuit according to claim 1, wherein the bridge rectifier performs rectification on the current detection signal to obtain a voltage that corresponds to the current detection signal, and wherein the secondary-side sampling current corresponds to the voltage.

9. A synchronous rectifier control method, comprising:
being connected, by a current transformer (CT), in series to a secondary side of a transformer;
performing, by the CT, sampling on a secondary-side current to obtain a current detection signal, and outputting the current detection signal to a bridge rectifier;
receiving, by the bridge rectifier, the current detection signal to obtain a secondary-side sampling current;
generating, by the bridge rectifier, the secondary-side sampling current according to a rectification of the current detection signal;
outputting the secondary-side sampling current to a comparator; and
receiving, by the comparator, the secondary-side sampling current so that the comparator generates a voltage difference,
wherein an output signal of the comparator turns over so as to control on and off of a synchronous rectifier transistor,
wherein the comparator is a current mirror comparator,
wherein the comparator comprises a first transistor and a second transistor,
wherein the first transistor in the comparator receives the secondary-side sampling current that is output by the bridge rectifier, and
wherein the second transistor comprises an emitter that generates the voltage difference so that the output signal of the comparator turns over.

10. The synchronous rectifier control method according to claim 9, wherein the CT is connected in series to a current loop of a secondary-side winding of the transformer.

11. The synchronous rectifier control method according to claim 9, wherein the CT is connected in series to a neutral wire of the transformer.

12. The synchronous rectifier control method according to claim 9, wherein the CT is connected in series to an upper tube of the transformer.

13. The synchronous rectifier control method according to claim 9, wherein the CT is connected in series to a lower tube of each configuration on the secondary side of the transformer.

14. The synchronous rectifier control method according to claim 9, wherein the bridge rectifier generates the secondary-side sampling current by performing diode-based rectification on the current detection signal to obtain a voltage that corresponds to the current detection signal, and wherein the secondary-side sampling current corresponds to the voltage.

15. An apparatus, comprising:
circuitry configured to:
couple a current transformer (CT) in series to a secondary side of a transformer;
sample, by the CT, a secondary-side current of the secondary side of the transformer to obtain a current detection signal;
output the current detection signal to a bridge rectifier;
generate, by the bridge rectifier, the secondary-side sampling current according to a rectification of the current detection signal;
output the secondary-side sampling current to a comparator; and
generate, by the comparator, a voltage difference according to the secondary-side sampling current,
wherein an output signal of the comparator turns over so as to control on and off of a synchronous rectifier transistor,
wherein the comparator is a current mirror comparator,
wherein the comparator comprises a first transistor and a second transistor,
wherein the first transistor in the comparator receives the secondary-side sampling current that is output by the bridge rectifier, and
wherein the second transistor comprises an emitter that generates the voltage difference so that the output signal of the comparator turns over.

16. The apparatus of claim 15, wherein the bridge rectifier performs rectification on the current detection signal to obtain a voltage that corresponds to the current detection signal, and wherein the secondary-side sampling current corresponds to the voltage.

17. The apparatus of claim 15, wherein an input end of the first transistor is configured to connect to an input end of the second transistor, connect to a first output end of the second transistor through a diode, and connect to a first output end of the first transistor, wherein the first output end of the first transistor is configured to connect to the first output end of the second transistor, wherein a second output end of the first transistor is configured to connect to the bridge rectifier, and wherein a second output end of the second transistor is configured to connect to the bridge rectifier.

18. The apparatus of claim 15, wherein the CT is connected in series to a current loop of a secondary-side winding of the transformer.

19. The apparatus of claim 15, wherein the CT is connected in series to a neutral wire of the transformer.

20. The apparatus of claim 15, wherein the CT is connected in series to an upper tube of the transformer or a lower tube of the transformer.

* * * * *